No. 718,533. PATENTED JAN. 13, 1903.
T. A. SEERY.
INSTANTANEOUS RELEASE FOR THE AIR BRAKE CYLINDERS OF
ENGINES AND TENDERS.
APPLICATION FILED APR. 4, 1902.
NO MODEL.
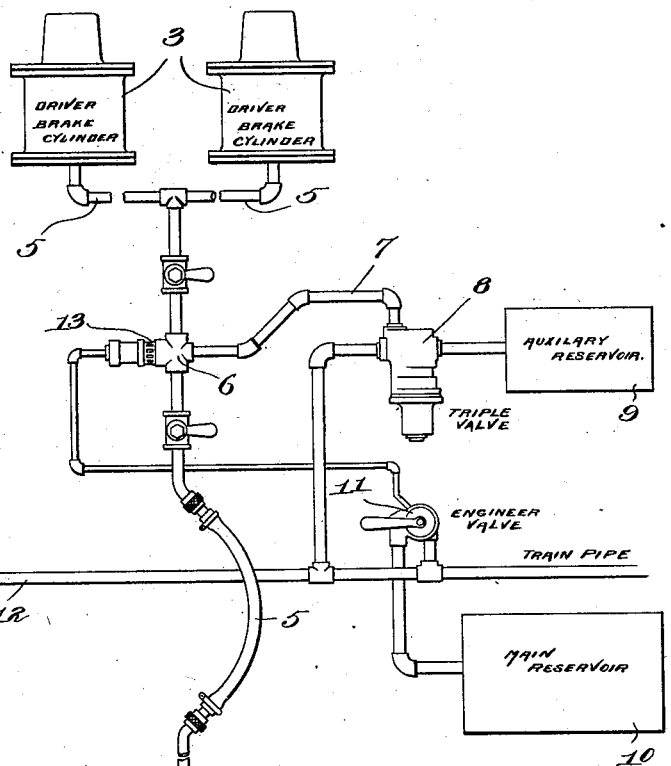
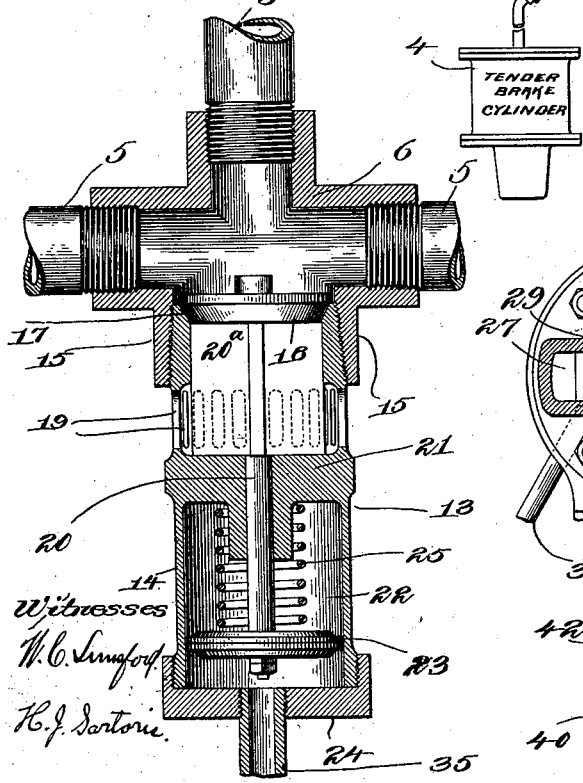
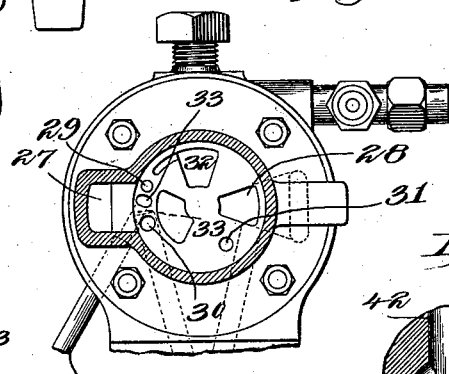
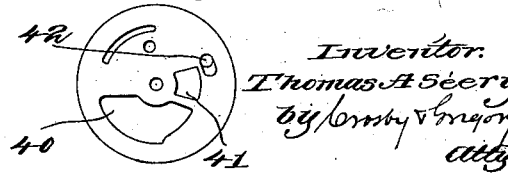

UNITED STATES PATENT OFFICE.

THOMAS A. SEERY, OF KEENE, NEW HAMPSHIRE.

INSTANTANEOUS RELEASE FOR THE AIR-BRAKE CYLINDERS OF ENGINES AND TENDERS.

SPECIFICATION forming part of Letters Patent No. 718,533, dated January 13, 1903.

Application filed April 4, 1902. Serial No. 101,326. (No model.)

*To all whom it may concern:*

Be it known that I, THOMAS A. SEERY, a citizen of the United States, residing at Keene, in the county of Cheshire and State of New Hampshire, have invented an Improvement in Instantaneous Release for the Air-Brake Cylinders of Engines and Tenders, of which the following description, in connection with the accompanying drawings, is a specification, like letters on the drawings representing like parts.

In the ordinary air-brake system the brakes are operated by means of a so-called "triple" valve, this valve operating to admit the air from the auxiliary reservoir to the brake-cylinders when the brakes are to be set, to open the brake-cylinders to the exhaust when the brakes are to be released, and to connect the main reservoir with the auxiliary reservoir through the train-pipe when the auxiliary reservoir is to be charged. The exhaust-port of the triple valve is so small that where the entire charge of air is to be exhausted from the brake-cylinders through the said port a considerable length of time is consumed in releasing the brakes. It is often desirable to release the brakes instantly, and various forms of so-called "quick-release" valves have been devised which have for their object to release the air-pressure in the brake-cylinder independently of the triple valve. So far as I am aware, however, all forms of quick-release valves heretofore devised have been operated by train-pipe pressure, and it is necessary with these devices to vary the train-pipe pressure by either increasing or diminishing it in order to secure the operation of the release-valve. These forms of release-valves have many disadvantages, arising from the fact that they are dependent for their operation upon train-pipe pressure, and these disadvantages are especially apparent in the operation of the brakes on an engine, for it is often times very desirable to release the engine-driver brakes instantly without being dependent upon the train-pipe pressure. For instance, if two engines coupled together were hitched to a train and if the first engine should become disconnected from the second engine the breaking of the train-pipe would of course immediately set the brakes upon said first engine and stop the same and also set the brakes upon the engine and cars in the train. The operation of the brakes on the cars, however, would not be as rapid as on the first engine, and as a result the second engine and train would collide with the head engine, thus causing more or less damage, for with the ordinary form of release-valves it would be impossible to release the brakes upon the head engine owing to the breaking of the train-pipe.

In engines utilized as switch-engines it is extremely desirable and advantageous to be able to instantly release the driver-brakes without being dependent upon the train-pipe pressure for this operation.

It is the object of my present invention to provide a novel form of instantaneous release which is especially adapted for engine and tender brakes and which is operated by main-reservoir pressure instead of train-pipe pressure.

In the drawings, Figure 1 is a diagrammatic view showing how my invention is applied to the brake-cylinders of the engine and tender. Fig. 2 is an enlarged sectional view of my release-valve. Fig. 3 is a sectional view of an engineer's valve altered to provide the necessary means for admitting the main-reservoir pressure to the release-valve. Fig. 4 is a bottom plan view of the rotary part of the engineer's valve, and Fig. 5 is a detail of the rotary part of the engineer's valve.

In Fig. 1 the two driver-brake cylinders are designated by 3 and the tender-brake cylinder by 4, these brake-cylinders being connected by suitable pipes 5 to a connection 6, which is connected by a pipe 7 with the triple valve 8. 9 is the ordinary auxiliary reservoir. 10 is the main reservoir. 11 is the engineer's valve, and 12 the train-pipe. These parts are and may be all as usually constructed and they perform their functions in a well-known manner.

The release-valve is designated generally by 13 and is shown in section in Fig. 2, the said valve comprising a casing 14, having a screw-threaded end which is connected to a nipple 15 on the connection 6. The end of the casing 14 is illustrated as provided with a valve-seat 17, on which normally rests a valve 18, and the casing 14 is provided with a series of exhaust-openings 19. The stem 20 of the valve passes through a suitable partition 21 across the casing and has a piston 23 thereon, which plays in a cylindrical chamber 22 in the end of the casing 14, said chamber being closed at its ends by a cap-piece 24. A spring 25 serves normally to keep the valve in its closed position; but when it is desired to instantly release the brakes compressed air from the main reservoir is delivered to the chamber 22, below the piston 23, and the piston is raised, thus lifting the valve 18 from its seat and allowing the air-pressure in the three connected brake-cylinders to be instantly exhausted through the exhaust-ports 19. I will preferably provide the valve-stem with guiding-wings 20$^a$, which serve to guide the valve in its movements and center it on its seat.

Any suitable means may be employed for admitting main-reservoir pressure to the chamber 22; but I prefer to provide the ordinary engineer's valve 11 with a supplemental port, which serves to admit the main-reservoir pressure to the said chamber. I have illustrated how this may be accomplished in Fig. 3, which shows a horizontal section of an ordinary engineer's valve, taken in the plane of the valve-seat, and in which 27 is the usual port through the casing which connects with the main reservoir and which admits main-reservoir pressure to the top of the rotary part of the valve, and 28 is the port through the stationary part which connects with the train-pipe. 29 is the preliminary exhaust-port. 30 is the feed-port, 31 the equalizing-port, and 32 the direct-application and exhaust port. These parts are as usually constructed, and their functions are familiar to those skilled in this art.

Between the preliminary exhaust-port and the feed-port I construct another vertically-arranged port 33 through the valve-seat, which connects with a horizontal passage 34 through the body of the valve, the said passage-way having a pipe 35 screwed thereinto, the other end of which passes into the cap 24 and opens into the chamber 22.

The rotary part of the engineer's valve is shown in bottom plan view in Fig. 4, and it has the usual supply-port 41, extending therethrough, and the usual cavity 40 and the smaller port 42, which extends vertically through said valve.

I will preferably enlarge the lower end of the port 42, as at 43, (see Fig. 5,) the said enlarged portion 43 being of a size to cover or partially cover the port 33 in the valve-seat when the rotary part is in "release" position. When in this position, it will be seen that the main-reservoir pressure, which is always above the rotary, is delivered through the port 42 to the feed-port and also through the enlarged portion 43 to the port 33 and through the pipe 35 to the chamber 22 in the release-valve. The position 23 therefore is subjected to main-reservoir pressure, which is usually about ninety pounds, and the release-valve 18 is suddenly opened and the air-brakes on the engine and tender are instantly released independently from the air-brakes on the cars and without reference to the condition of the train-pipe.

With my improvements as exemplified in the drawings the shifting of the engineer's valve into release position performs two functions—first, opens the release-valve for the engine and tender brakes, so that they are instantly released, and, second, operates the triple valve, so as to gradually release the brakes on the cars. It is not essential to my invention, however, that I employ an engineer's valve having the extra port 33, for I may find it convenient under some circumstances to provide some other suitable valve device for admitting the main-reservoir pressure to the chamber 22 of the release-valve, and I would consider as coming within my invention any quick-release valve which is constructed to be operated by main-reservoir pressure. It will be noted that in this embodiment of my invention the two cylinders for the engine-driver brakes and the cylinder for the tender-brakes are connected together, and by means of my improved release-valve the pressure in all three of these cylinders may be instantly and simultaneously released.

Since by means of my construction I employ the main-reservoir pressure for operating the release-valve, it is not necessary to have the piston 23 of a larger size than the area of the face of the valve 18, as would be the case if train-pipe pressure were employed to operate the valve, for the main-reservoir pressure is always maintained at about ninety pounds, which is considerably greater than the pressure ever is in the brake-cylinder.

I have found from experience that the invention above described finds its greatest utility when used on switch-engines, particularly where the brakes are constantly being applied and released and there is a necessity for quick action, though it will be obvious that the invention is not limited to such use.

Although I have illustrated one simple embodiment of my invention, it will be obvious that changes may be made in details of the structure without departing from the spirit of the invention as expressed in the appended claims.

Having described my invention, what I claim as new, and desire to secure by Letters Patent, is—

1. In an air-brake system, the combination with the brake-cylinders for the engine-driver brakes, a main reservoir, an auxiliary reservoir, a triple valve, of means to instantly release the pressure in the said brake-cylinders, independently of the operation of the brakes on the cars, said means comprising a supplemental release-valve connected to the said brake-cylinders, and means carried entirely by the engine and under the control of the engineer to operate said release-valve by the main-reservoir pressure.

2. In an air-brake system, the combination with a plurality of connected brake-cylinders on the engine, a main and auxiliary reservoir, an engineer's valve, a triple valve, of a supplemental release-valve connected to said cylinders, and connections between said release-valve and the main reservoir, said connections being carried entirely by the engine and controlled by the engineer's valve, whereby the release-valve may be operated by the main-reservoir pressure.

3. In an air-brake system, the combination with the brake-cylinders for the brakes on the engine and tender, a main reservoir, and a triple valve, a supplemental release-valve connected to said cylinders, and means under the control of the engineer and carried entirely by the engine for operating the release-valve by the main-reservoir pressure, the construction of the release-valve being such that the brakes may be instantly released.

4. In an air-brake system, the combination with the brake-cylinders for the engine-driver brakes, a main and an auxiliary reservoir, an engineer's valve and a triple valve, of a supplemental release-valve connected to said cylinders, and connections between said release-valve and the main reservoir, said connections being controlled by the engineer's valve whereby the release-valve is operated by the main-reservoir pressure.

5. The combination with a brake-cylinder, a main reservoir, and an auxiliary reservoir, and a triple valve, of a release-valve connected to the brake-cylinder and an engineer's valve, said engineer's valve having in addition to the auxiliary ports a supplemental port connected to the release-valve and adapted to be connected with the main-reservoir pressure, whereby the release-valve may be operated from main-reservoir pressure and independently of train-pipe pressure.

In testimony whereof I have signed my name to this specification in the presence of two subscribing witnesses.

THOMAS A. SEERY.

Witnesses:
HIRAM BLAKE,
DAVID KENNEDY.